(12) United States Patent
Adkisson

(10) Patent No.: US 6,442,807 B1
(45) Date of Patent: Sep. 3, 2002

(54) AIRBAG BUCKLE ASSEMBLY

(75) Inventor: Rick Alexander Adkisson, Gold Canyon, AZ (US)

(73) Assignee: Am-Safe, Inc., Phoenix, AZ (US)

( * ) Notice: Subject to any disclaimer, the term of this patent is extended or adjusted under 35 U.S.C. 154(b) by 0 days.

(21) Appl. No.: 09/524,191

(22) Filed: Mar. 13, 2000

(51) Int. Cl.⁷ .......................... A44B 11/25; B60R 21/18
(52) U.S. Cl. .......................... 24/633; 24/602; 280/733; 280/735
(58) Field of Search .......................... 24/633, 602, 603, 24/303; 280/735, 733, 150

(56) References Cited

U.S. PATENT DOCUMENTS

| | | | | |
|---|---|---|---|---|
| 3,597,811 A | * | 8/1971 | Cunningham | 24/633 |
| 3,866,940 A | * | 2/1975 | Lewis | 280/150 |
| 3,921,363 A | * | 11/1975 | Beynon | 52/758 A |
| 5,222,761 A | * | 6/1993 | Kaji et al. | 280/730 |
| 5,851,025 A | * | 12/1998 | Gamboa | 24/633 |
| 5,947,513 A | * | 9/1999 | Lehto | 280/733 |
| 5,984,350 A | * | 11/1999 | Hagan et al. | 280/735 |
| 5,992,879 A | * | 11/1999 | Bogge | 280/735 |
| 6,062,596 A | * | 5/2000 | Boydston et al. | 280/733 |
| 6,290,257 B1 | * | 9/2001 | Bunce | 280/739 |
| 6,325,412 B1 | * | 12/2001 | Pan | 280/733 |

* cited by examiner

*Primary Examiner*—Victor Sakran
(74) *Attorney, Agent, or Firm*—Richard A. Speer; Mayer Brown Rowe & Maw

(57) ABSTRACT

The present invention relates to a buckle assembly for use in a restraint system for protecting a vehicle passenger during a crash event. The buckle assembly includes a connector, an airbag buckle and a means for ensuring that the connector may only be inserted into an airbag buckle and that the connector may only be inserted into an airbag buckle in a single orientation. The connector includes a mechanical stop with an offset edge. This offset edge must engage within a clearing slot located within the airbag buckle in order for the connector to latch into the airbag buckle. Latching of the connecting element with other non-airbag buckles or with the air bag buckle when the connector is not in the proper orientation is thus prevented.

5 Claims, 1 Drawing Sheet

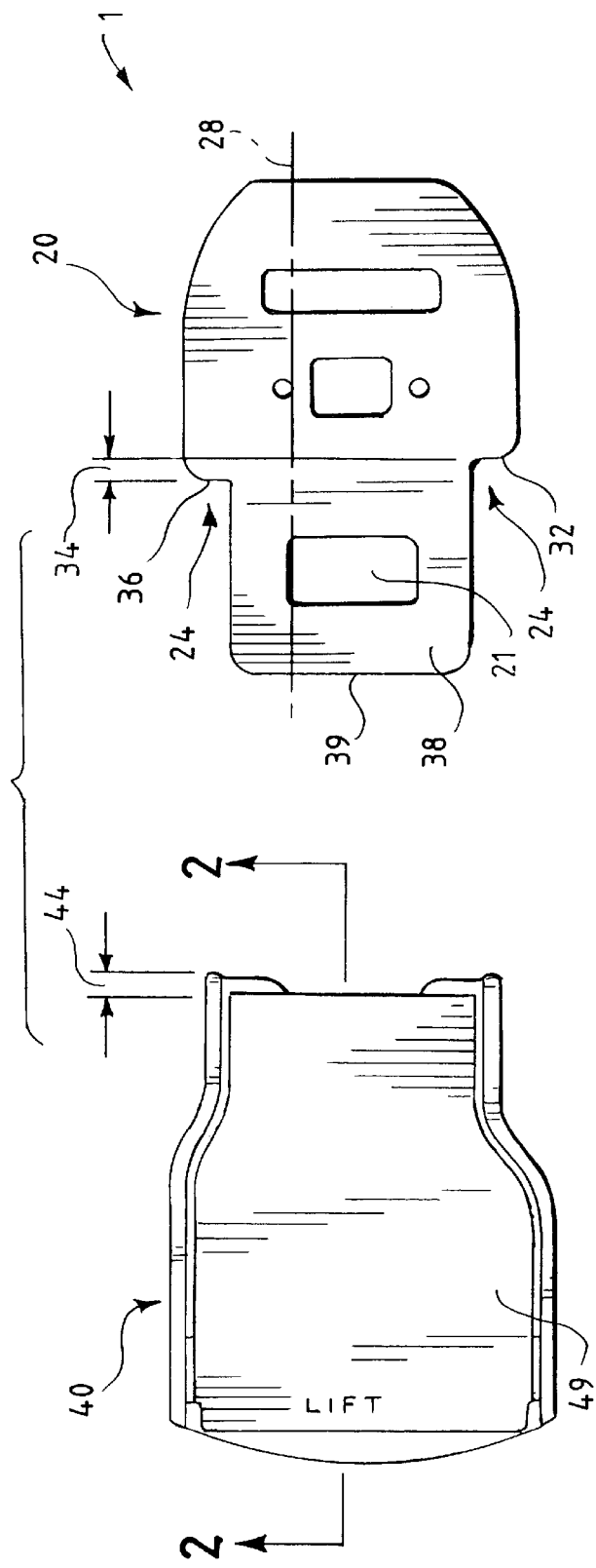
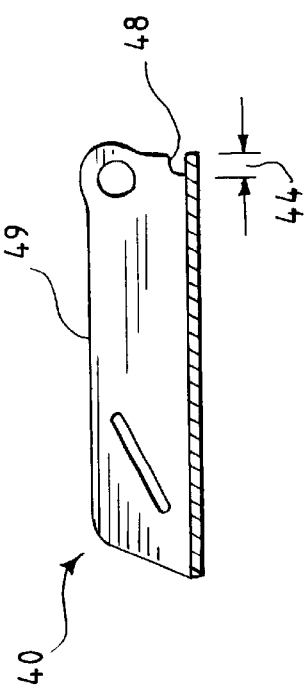
FIG. 1
FIG. 2

AIRBAG BUCKLE ASSEMBLY

BACKGROUND OF THE INVENTION

1. Field of the Invention

The present invention relates to an airbag buckle assembly for use in a passenger safety system, particularly restraint systems, designed to protect vehicle passengers during a crash event. Particularly, the present invention is directed to a buckle assembly comprising a connector and an airbag buckle wherein the connector can only be connected to an airbag buckle and wherein the connector and the airbag buckle can only be latched together in a single orientation.

2. Description of Related Art

Prior passenger safety systems found in vehicles such as automobiles and aircraft have generally been restraint systems of two principal types, seat belts and airbags. Possibly the earliest to be used was the passenger lap belt which was attached to a fixed substructure at each end and was joined over the users lap by suitable buckle assemblies. A typical buckle assembly included a connector and a buckle. The connector included a tongue with a hole in it and the buckle included a locking mechanism, a rotatable plate and an ejector spring. The distal end of the tongue was inserted into the buckle. Inside the buckle, the locking mechanism engaged the hole in the connector's tongue, thereby latching and securing the buckle assembly. To disengage the connector from the buckle, the plate was lifted causing the ejector spring within the airbag buckle to disengage the connector.

Normally, one of the two pieces making up the belt was of fixed length while the length of the other piece could be adjusted in order that the belt could accommodate users of all sizes. This type of belt was used for many years in automobiles and remains to this day the principal type of restrain system used for passenger safety in private and commercial aircraft.

Later, to further protect against possible injury, the lap belts in automobiles were modified to include a shoulder strap that was attached at a third fixed point to restrain the passenger's upper torso against forward movement during a crash event. The latest significant protective equipment added to passenger automobiles were passive restraints or airbags. Airbags, which are inflated by compressed gas, are mounted in the automobile steering column and other fixed locations within the automobile, such as the dash board and side panels. In the event of a sudden deceleration, as in a crash event, sensors identify the event and the compressed gas is released to expand the airbags at high speeds in the direction of the passenger to prevent forward movement of the passenger. Airbags have proven generally effective in providing passenger protection especially when used in conjunction with safety belts.

While airbags are now common as passive restraints for passengers in the front seat of an automobile, their use is not equally widespread in trucks, related commercial vehicles or in the rear seats of automobiles. Further, seat mounted airbags have not been used in aircraft for passenger protection, for reasons having to do primarily with aircraft design and use, seat design and seat location. Seats in commercial aircraft, unlike those in land vehicles, are not fixed in a permanent position. For example, the seats are movable to different locations and are removable. In addition, the backs of aircraft seats are not rigidly mounted but, rather, they swing forward and down in a crash event, so they cannot be used to house airbags.

In order to enable the use of airbags in aircraft by providing a restraint system that is not permanent in nature, later designs have used an airbag/safety belt restraint. U.S. Pat. No. 5,984,350 illustrates such a system where the airbag is embedded within the lap belt. This system uses electronics to sense a crash event wherein an airbag embedded in the lap belt is deployed in a direction away from the passenger wearing the lap belt. The airbag can only deploy if the two pieces of the lap belt are latched together. The lap belt is secured around the lap of the passenger by use of a buckle assembly comprising a buckle connected to one piece of the belt and a connector attached to the other piece of the belt. In such a system, it is critical that the lap belt be oriented so that the air bag deploys away from the passenger. Additionally, it is important that the connector is capable of only being latched into a buckle designed for airbag use so that deployment of the airbag can be enabled. The system disclosed in U.S. Pat. No. 5,984,350 attempts to ensure proper orientation of the buckle assembly by using stiff material to prevent rotation of the pieces of the lap belt. However, this makes the belt less comfortable for the passenger who may be then less likely to actually wear the restraint. Furthermore, it may still be possible to rotate the pieces of the belt. The belt may be made more comfortable by making the pieces less stiff. However, the less stiff the pieces of the belt become, the more rotatable they become. Conversely, the more stiff the belt pieces become, the less comfortable the belt becomes. Additionally, the design disclosed in U.S. Pat. No. 5,984,350 does not address the issue of ensuring that the connector can only be inserted into a buckle designed for use with an airbag/safety belt restraint.

OBJECTS OF THE INVENTION

It is an object of this invention to provide a buckle assembly for use with an airbag/safety belt restraint which can be used on aircraft and land vehicles which greatly reduces the potential for misuse of the safety belt by both those installing the safety belt and the passengers using the safety belt.

Another object of the invention is to provide a buckle assembly for use with an airbag/safety belt restraint that permits the buckle assembly's connector to only latch into a buckle designed for use with an airbag/safety belt restraint.

Another object of the invention is to provide a buckle assembly for use with an airbag/safety belt restraint where the connector of the buckle assembly can only be latched into the buckle in a single orientation.

Another object of the invention is to provide a buckle assembly for use with an airbag/safety belt restraint that eliminates the need to use stiff material for the pieces of the safety belt thus increasing passenger comfort.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a buckle assembly for use in a restraint system for protecting a vehicle passenger during a crash event. The buckle assembly includes a connector, an airbag buckle and a means for ensuring that the connector may only be inserted into an airbag buckle and that the connector may only be inserted into an airbag buckle in a single orientation. The connector includes a mechanical stop with an offset edge. This offset edge must engage within a clearing slot located within the airbag buckle in order for the connector to latch into the airbag buckle. Latching of the connecting element with other non-airbag buckles or with the air bag buckle when the connector is not in the proper orientation is thus prevented.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings, serve to explain the principles of the invention.

BRIEF DESCRIPTION OF THE DRAWINGS

FIG. 1 is a schematic representation of the buckle assembly in accordance with the invention.

FIG. 2 is a cross sectional view of the airbag buckle 40 along line A—A shown in FIG. 1.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

The apparatus presented herein includes a buckle assembly. For purpose of explanation and illustration, and not limitation, an exemplary embodiment of the system in accordance with the invention is shown in FIG. 1 and is designated generally by reference character 1.

As shown in FIG. 1, the buckle assembly 1 generally includes a connector 20 and a buckle designed for use with an airbag/safety belt restraint, hereinafter referred to as an airbag buckle 40. The connector 20 comprises a longitudinal axis 28, a tongue 38 with a distal end 39, and a mechanical stop 24. The mechanical stop has an edge 32 and an offset edge 36 that is offset from the edge 32 along the longitudinal axis 28 of the connector 20 a distance 34 in the direction of the distal end 39 of the tongue 38. The connector 20 also includes a hole 21 locate on its tongue 38. As shown FIG. 1 and FIG. 2, the airbag buckle 40 includes a clearing slot 48 with a length 44 and a plate 49. The length 44 of the clearing slot 48 is at least equal to the distance 34 and may be longer.

The buckle assembly 1, generally operates in a known fashion wherein the tongue 38 of connector 40 is inserted into the airbag buckle 40 so that the hole 21 latches with the airbag buckle's locking mechanism (not shown). The connector 20 is disengaged from the airbag buckle 40 by lifting the plate 49. However, in the present invention, the connector 20 can only be latched into a buckle 40 in a single orientation. The tongue 38 of the connector 20 must be inserted into the airbag buckle 40 so that the offset edge 36 of the mechanical stop 24 engages within the clearing slot 48 of the airbag buckle 40. If, on the other hand, the tongue 38 of connector 20 is inserted into the airbag buckle 40 orientated so that it is rotated 180 degrees around its longitudinal axis from the orientation shown in FIG. 1, the offset edge 36 would not engage within the clearing slot thus preventing the hole 21 from reaching the locking mechanism (not shown) in the airbag buckle 40. Thus the connector 20 is prevented from latching within the airbag buckle 40.

The offset edge 36 of the connector 20 also prevents the connector 20 from being latched into a non-airbag buckle. Since a non-airbag buckle does not include a clearing slot, the hole 21 of the connector 20 will be prevented from reaching the locking mechanism of the non-airbag so that the connector 20 cannot be latched into a non-airbag buckle.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A buckle assembly for use in a restraint system for protecting a vehicle passenger during a crash event comprising:
    a connector with a longitudinal axis and having a mechanical stop including an edge and an offset edge that is offset a distance along the longitudinal axis of the connector from the edge; and an airbag buckle having a clearance slot to receive the connector in a single orientation.

2. A buckle assembly as claimed in claim 1 wherein the clearance slot has a length that is at least as long as the distance the offset edge is offset from the edge.

3. A buckle assembly as claimed in claim 1 wherein the connector has a tongue plate comprising a distal end and the mechanical stop comprises an edge and an offset edge wherein the offset edge is a distance closer to the distal end of the tongue plate.

4. A buckle assembly as claimed in claim 3 wherein the clearance slot is located on the airbag buckle so that when the distal end of the tongue plate is latched into the airbag buckle the offset edge is inserted into the clearance slot.

5. A buckle assembly for use in a restraint system for protecting a vehicle passenger during a crash event, wherein the restraint system comprises a first belt piece, a second belt piece and an airbag embedded within the first belt piece, wherein the buckle assembly comprises:
    a connector attached to the first belt piece wherein the connector can only latched into an airbag buckle and can latch into an airbag buckle only in a single orientation wherein the single orientation is such that the airbag deploys in a direction away from the passenger, wherein the connector comprises:
        a longitudinal axis,
        a tongue plate with a distal end,
        a mechanical stop comprising an edge and an offset edge wherein the offset edge is offset from the edge along the longitudinal axis a distance closer to the distal end; and
    an airbag buckle attached to the second belt piece, comprising a connector slot having a length equal to or greater than the distance the offset edge is offset from the edge.

* * * * *